(12) United States Patent
Takano et al.

(10) Patent No.: US 8,059,366 B2
(45) Date of Patent: Nov. 15, 2011

(54) PERPENDICULAR MAGNETIC RECORDING HEAD WITH A LAMINATED POLE

(75) Inventors: Kenichi Takano, Cupertino, CA (US); Lijie Guan, San Jose, CA (US); Yuchen Zhou, Milpitas, CA (US); Joe Smyth, Aptos, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1030 days.

(21) Appl. No.: 11/879,952

(22) Filed: Jul. 19, 2007

(65) Prior Publication Data
US 2009/0021868 A1    Jan. 22, 2009

(51) Int. Cl.
G11B 5/147      (2006.01)
G11B 5/127      (2006.01)

(52) U.S. Cl. .................... 360/125.12; 360/125.08
(58) Field of Classification Search ........... 360/125.08, 360/125.12, 125.24, 125.28, 125.45, 125.5, 360/125.58, 125.63, 125.69, 125.73
See application file for complete search history.

(56) References Cited

U.S. PATENT DOCUMENTS

| | | | |
|---|---|---|---|
| 5,379,172 A | 1/1995 | Liao | |
| 6,233,116 B1 | 5/2001 | Chen et al. | |
| 6,243,939 B1 | 6/2001 | Chen et al. | |
| 6,950,277 B1 | 9/2005 | Nguy et al. | |
| 7,057,853 B2 | 6/2006 | Okada et al. | |
| 7,120,988 B2 | 10/2006 | Le et al. | |
| 2003/0133223 A1* | 7/2003 | Minor ................... | 360/125 |
| 2004/0004786 A1* | 1/2004 | Shukh et al. .......... | 360/126 |
| 2004/0120074 A1* | 6/2004 | Okada et al. .......... | 360/126 |
| 2006/0044680 A1* | 3/2006 | Liu et al. ............... | 360/126 |
| 2006/0098334 A1* | 5/2006 | Jayasekara et al. ... | 360/125 |
| 2006/0232882 A1* | 10/2006 | Lee et al. .............. | 360/126 |

OTHER PUBLICATIONS

Co-pending U.S. Appl. No. 11/825,034, filed Jul. 3, 2007, "A Laminated Film for Head Applications", assigned to the same assignee as the present invention.
Co-pending U.S. Appl. No. 11/820,962, filed Jun. 21, 2007, "PMR with Improved Writability and Process Controllability by Double Layer Patterning", assigned to the same assignee as the present invention.
High Moment Materials and Fabrication Processes for Shielded Perpendicular Write Head Beyond 200 Gb/in$^2$, by Y. Chen et al., IEEE Trans. on Mag., vol. 43, No. 2, Feb. 2007, pp. 609-614.

(Continued)

Primary Examiner — Daniell L Negron
Assistant Examiner — Adam B Dravininkas
(74) Attorney, Agent, or Firm — Saile Ackerman LLC; Stephen B. Ackerman (57) ABSTRACT

A laminated write pole layer for a PMR write head is disclosed in which a plurality of "n" magnetic layers and "n−1" non-magnetic spacers are formed in an alternating fashion on a substrate. The non-magnetic spacers promote exchange decoupling or antiferromagnetic coupling between adjacent magnetic layers. Writability is improved when the trailing magnetic layer has a thickness greater than the thickness of other magnetic layers and preferably >25% of the total thickness of the magnetic layers. The thicknesses of the other magnetic layers may be equal or may become progressively smaller with increasing distance from the trailing magnetic layer. In another embodiment, the non-magnetic spacer between the trailing magnetic layer and the nearest magnetic layer is replaced by a magnetic spacer made of a soft magnetic material to promote magnetic coupling and effectively increase the thickness of the trailing magnetic layer.

11 Claims, 8 Drawing Sheets

OTHER PUBLICATIONS

"Magnetic Properties of FeCo Multilayered Films for Single Pole Heads", by Yasuyuki Okada et al., IEEE Trans. on Mag., vol. 40, No. 4, Jul. 2004, pp. 2368-2370.

"Micromagnetics of Laminated Permalloy Films", by John C. Slonczewski et al., IEEE Trans. on Mag., vol. 24, No. 3, May 1988, pp. 2045-2054.

* cited by examiner

PERPENDICULAR MAGNETIC RECORDING HEAD WITH A LAMINATED POLE

RELATED PATENT APPLICATIONS

This application is related to Ser. No. 11/825,034, filing date Jul. 3, 2007; and Ser. No. 11/820,962, filing date Jun. 21, 2007; both assigned to the same assignee as the current invention and which are herein incorporated by reference in its entirety.

FIELD OF THE INVENTION

The invention relates to a main pole layer of a PMR writer and a method for making the same wherein the main pole layer is a laminate of a magnetic material and a non-magnetic spacer to improve overwrite performance, minimize data erasure after a write operation, and improve signal to noise ratio.

BACKGROUND OF THE INVENTION

Perpendicular magnetic recording (PMR) has become the mainstream technology for disk drive applications beyond 200 Gbit/in$^2$, replacing longitudinal magnetic recording (LMR) devices. Due to the continuing reduction of transducer size, high moment soft magnetic thin films with a Bs above 22 kG are required for write head applications. A PMR head which combines the features of a single pole writer and a double layered media has a great advantage over LMR in providing higher write field, better read back signal, and potentially much higher areal density. In particular, a shielded pole head can provide a large head field gradient at the trailing side due to the presence of a trailing shield and substantially improve the write performance. However, PMR still suffers some problems. One of the biggest issues is the head-induced data erasure that is of particular concern since the erasure occurs after writing. This type of erasure is believed to be caused by a remanent magnetization in the main pole layer and is also related to the sharp pointed geometry of the write pole.

Figure 1:
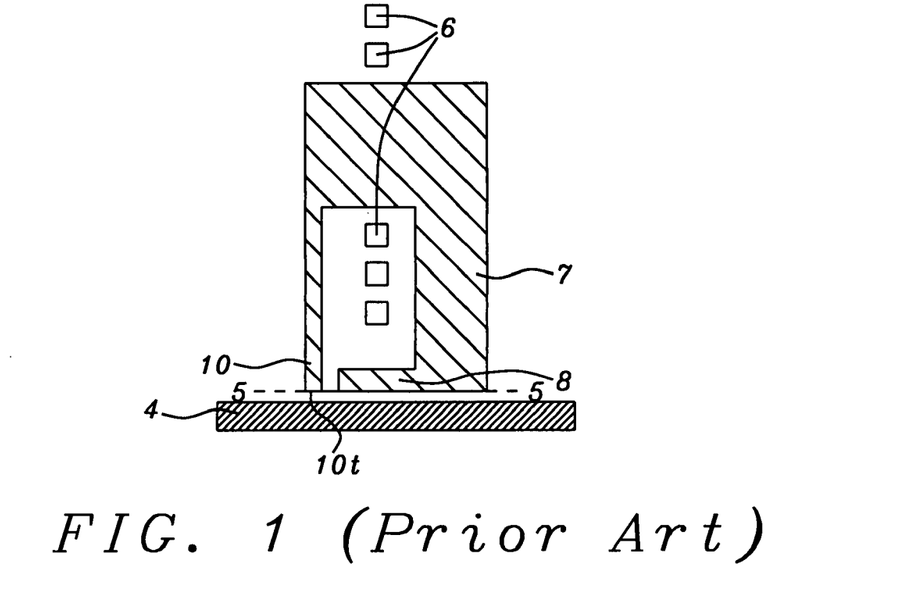
FIG. 1 is a cross-sectional view of a conventional PMR writer showing the main write pole, flux return pole, magnetic recording media, and coils that generate magnetic flux.

A conventional PMR write head as depicted in FIG. 1 typically has a main pole layer 10 or write pole with a pole tip 10t at an air bearing surface (ABS) 5 and a flux return pole (opposing pole) 8 which is magnetically coupled to the write pole through a trailing shield 7. Magnetic flux in the write pole layer 10 is generated by coils 6 and passes through the pole tip into a magnetic recording media 4 and then back to the write head by entering the flux return pole 8. The write pole concentrates magnetic flux so that the magnetic field at the write pole tip 10t at the ABS is high enough to switch magnetizations in the recording media 4. A trailing shield 7 is added to improve the field gradient in the down-track direction.

Figure 2:
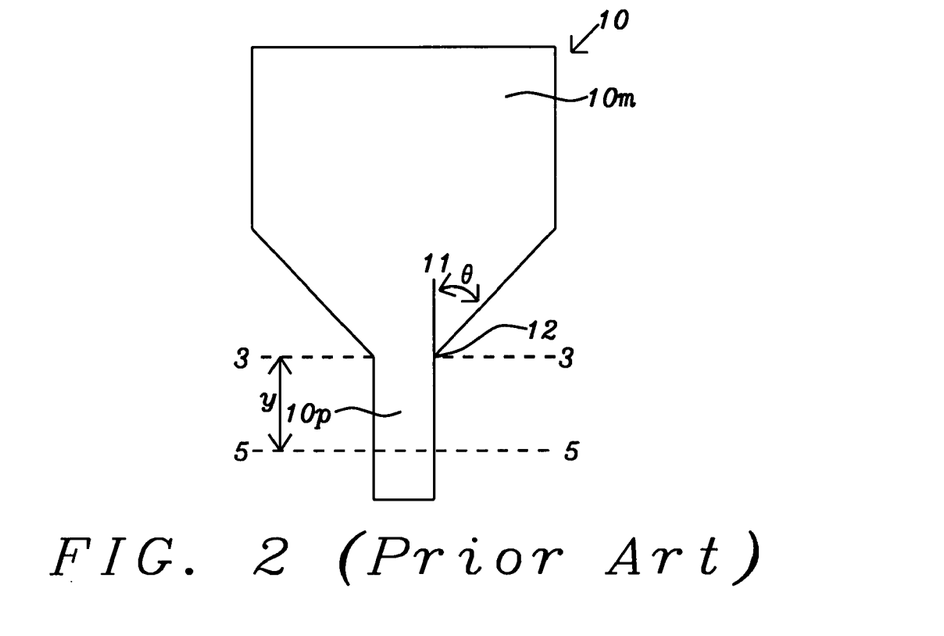
FIG. 2 is a top view showing a main write pole layer of a conventional PMR write head that has a narrow write pole section adjacent to the ABS and a larger yoke section with sides that flare outward at an angle θ from the sides of the narrow write pole.

Referring to FIG. 2, a top view is shown of a typical main pole layer 10 that has a large, wide portion called a yoke 10m and a narrow rectangular portion 10p called a pole that extends a neck height (NH) distance y from the ABS plane 5-5 to a plane 3-3 parallel to the ABS where the pole intersects the yoke at the neck 12. The main pole layer 10 flares outward at an angle θ from a dashed line 11 that is an extension of one of the long rectangular sides of the pole 10p. PMR technologies require the pole 10p at the ABS to have a beveled shape (as viewed from the ABS) so that the skew related writing errors can be suppressed.

In the fabrication process, the yoke 10m and pole 10p may be formed by patterning a photoresist layer (not shown) above an alumina layer and then transferring the pattern through the alumina by an etching process to form a mold. An electroplating process or sputter deposition method may be used to deposit a main pole layer 10 that fills the cavity in the alumina. Finally, a lapping process is employed to remove the end of the pole 10p opposite the yoke 10m and thereby define an ABS plane 5-5.

Laminating a write pole layer and main pole is shown to improve the erase-after-write problem by Y. Okada, et al. in "Magnetic properties of FeCo multilayered films for single pole heads", IEE Trans. Magn., Vol. 40, No. 4, pp. 2368-2370 (July 2004). Anti-ferromagnetic coupling was observed between 25 nm thick FeCo layers and 1 nm thick Cr layers, and [FeCo/Cr]$_n$ multilayered configurations helped stabilize the pole.

Slonczewski et al. in "Micromagnetics of laminated permalloy films", IEEE Trans. on Magn., Vol. 24, No. 3, pp. 2045-2053 (May 1998), report that lamination may be used to eliminate closure-domain walls from certain shapes of practical interest. In one example, two permalloy films each 1.6 microns thick in the main pole layer are separated by a non-magnetic layer that is 12 nm thick.

In other prior art, U.S. Pat. No. 6,950,277 discloses a write pole that has a thin downstream magnetic layer having lower saturation magnetization and a thicker upstream magnetic layer with higher saturation magnetization that is designed to straighten the write field contour of the pole tip.

In U.S. Pat. No. 6,243,939, a first pole layer made of NiFe or CoFeNi is separated from a second pole layer made of the same material by a write gap layer that has a high ion beam etch rate to prevent erosion of the second pole layer during a trimming step.

U.S. Pat. No. 6,233,116 teaches a laminated write pole in which 500 to 600 Angstrom thick layers of high moment magnetic material such as FeRhN are separated by a 100 to 200 Angstrom thick amorphous alloy layer such as CoZrCr. In this case, both types of layers are magnetic to improve overall permeability and uniaxial anisotropy in the high moment material. However, magnetic remanence is not improved.

In U.S. Pat. No. 5,379,172, a magnetic head with upper and lower pole tips having a laminated structure comprised of NiPX alloy layers and NiFe layers is described. The layers on the ends of the lamination have a thickness of D while the middle layers have a thickness of 2D.

U.S. Pat. No. 7,120,988 describes a method of forming a write pole with a trailing shield. The write pole is laminated with magnetic layers (CoFe, NiFe, or CoFe/NiFe) and non-magnetic layers of Rh, Ru, or Cr. There is no description of the relative thickness of the layers but a drawing suggests essentially the same thickness for each laminated layer.

A laminated high moment film involving an antiferromagnetic coupling scheme with Ru coupling layers between high moment layers has been described in U.S. Pat. No. 7,057,853 and by Y. Chen et al. in "High moment materials and fabrication processes for shielded perpendicular write head beyond 200 Gb/in$^2$", IEEE Trans. Magn. Vol 43, No. 2, p 609 (2007). In the laminated scheme, a high moment material such as a FeCo layer is laminated into several thinner FeCo layers that are separated by non-magnetic layer insertions. When a non-magnetic lamination material such as Ru, Rh, or Cr reaches a certain thickness, a coupling energy is generated such that the magnetization of the FeCo layers on either side of a Ru or non-magnetic layer will align in anti-parallel directions thereby establishing an anti-ferromagnetic (AFC) laminated configuration. Since the magnetization in a FeCo layer is oriented opposite to that of the magnetic moment in the nearest FeCo layer, the remanent magnetization can be reduced.

One disadvantage of prior art AFC lamination schemes is that the coupling strength of a FeCo/Ru/FeCo configuration or the like is typically large and this type of AFC lamination will inevitably cause a large anisotropy field and low magnetic moment under a low field. Although the coupling strength can be lowered by using a thicker non-magnetic layer (increasing Ru thickness from 7.5 to about 18 Angstroms, for example), the magnetic moment will be diluted as the non-magnetic content in the FeCo/Ru/FeCo stack is increased. Therefore, an improved lamination scheme for a write pole is needed that enables a high magnetic moment while simultaneously providing a mechanism to reduce remanence.

SUMMARY OF THE INVENTION

One objective of the present invention is to provide a laminated main pole layer with high moment material that provides good overwrite performance, and has a design that reduces remanence so that pole erasure is minimized in PMR writer applications.

Another objective of the present invention is to provide a laminated main pole layer according to the first objective while providing a means to improve signal to noise ratio.

A third objective of the present invention is to provide a method for forming a laminated main pole layer according to the first two objectives that is compatible with current manufacturing process flows and equipment.

These objectives are realized in the present invention by first providing a substrate upon which a write pole and main pole layer may be formed. In one embodiment, an etch stop layer may be formed on the substrate followed by forming an insulation layer on the etch stop layer. A mold for the main pole layer is formed in the insulation layer by a sequence of photoresist imaging and etching steps. In one aspect, a photoresist layer is coated on the insulation layer and patternwise exposed to form an opening in the shape of a main pole layer with yoke and write pole sections that uncovers a portion of the insulation layer. Thereafter, the opening is transferred through the insulation layer by a reactive ion etch (RIE) process that stops on the etch stop layer. Optionally, the mold formation sequence may include a first photoresist patterning and etching sequence followed by a second photoresist patterning and etching sequence to define different portions of the opening that correspond to different sections of the main pole layer.

After the photoresist layer is removed, a seed layer may be deposited on the insulation layer and on the etch stop layer within the mold shape. Then a series of sputter deposition steps are performed to fabricate the main pole layer within the mold shape. A key feature is that the main pole layer has a laminated structure comprised of a magnetic layer (M) such as FeCo or FeCoNi and a non-magnetic spacer (S) such as Ru or $Al_2O_3$ to give a $[M/S]_n/M$ configuration where n is an integer. Preferably, a thickness for the non-magnetic spacer is selected so that each magnetic layer is exchange decoupled or anti-ferromagnetically coupled through the non-magnetic spacer. Furthermore, the thickness of the magnetic layer on the trailing side of the laminated structure is made thicker than the other magnetic layers. In one aspect, when the trailing magnetic layer has a concave shape with a curved trailing edge, the volume of trailing magnetic layer is preferably greater than 25% of the total magnetic layer volume in the laminated write pole structure. When the trailing magnetic layer has a flat trailing edge, then the thickness of the trailing magnetic layer is preferably greater than 25% of the total thickness of the magnetic layers.

In one embodiment, the other magnetic layers in the laminated structure have essentially the same thickness which is less than the thickness of the trailing magnetic layer. Alternatively, the thickness of each successive magnetic layer becomes greater from leading edge to trailing edge in the laminated structure and the trailing magnetic layer thickness comprises at least 25% of the total thickness of all magnetic layers. In a third embodiment, there is a magnetic spacer between the trailing magnetic layer and the adjacent magnetic layer while a non-magnetic spacer is employed between other magnetic layers in the laminated structure. After the laminated main pole layer is formed, one or more annealing processes such as hard axis annealing, easy axis annealing, or combinations of both hard axis and easy axis annealing may be employed. Then a planarization process such as a chemical mechanical polish (CMP) step may be performed to make the top surface of the laminated main pole layer coplanar with the adjacent insulation layer.

The present invention also anticipates that a laminated write pole layer may be formed by a photoresist patterning and etching process that includes an ion beam etch or the like. For example, a photoresist layer may be patterned in the shape of a main pole layer including a write pole on the stack of laminated layers on a substrate to provide an etch mask such that a subsequent etch removes portions of the laminated stack not protected by the etch mask. Once the photoresist mask is removed, an insulation layer is deposited on and adjacent to the patterned write pole and main pole layer and then in a subsequent planarization step, the insulation layer is made coplanar with the write pole and main pole layer.

DETAILED DESCRIPTION OF THE INVENTION

The present invention is a laminated main pole layer formed in a PMR writer and a method of making the same. Although the exemplary embodiments describe a main pole layer in which both the write pole and yoke are laminated, the present invention also anticipates embodiments wherein the write pole is laminated and at least a portion of the main pole layer is not laminated. In addition, the main pole layer may have a stitched pole structure. Furthermore, the present invention is not bound by any particular write pole shape as viewed from the ABS plane, and thereby encompasses trapezoidal shapes as well as shapes that have one or more curved sides including a concave trailing edge as appreciated by those skilled in the art.

Figure 3:
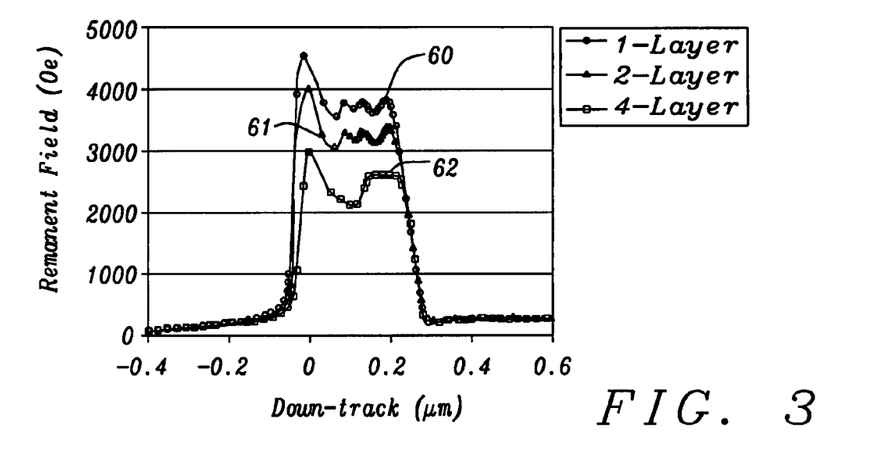
FIG. 3 is a graph that shows the remanent field decreases as the number of laminated magnetic layers with equal thickness in a conventional write pole increases.
Figure 4:
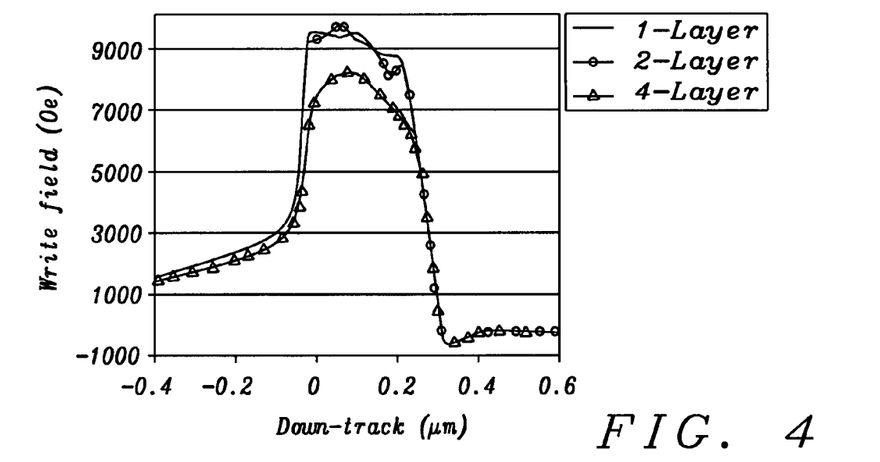
FIG. 4 is a graph that shows the write field in a down-track position decreases as the number of laminated layers with equal thickness in a conventional write pole increases.
Figure 5:
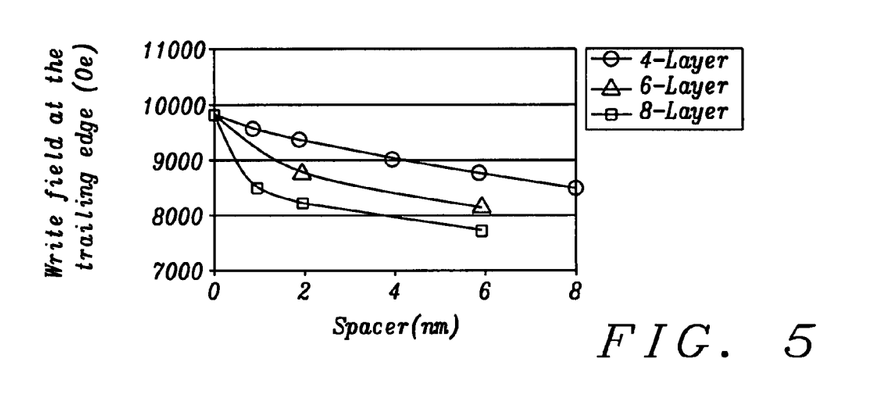
FIG. 5 is a graph that shows the write field at the trailing edge decreases as the thickness of the non-magnetic spacer layers increases in a conventional write pole.

The inventors were motivated to improve the design of a laminated write pole structure since prior art designs that minimize remanent magnetization and successfully suppress data erasure have a disadvantage in poor writability. Data erasure is a critical issue because a main pole layer must have a sharp pointed geometry that easily causes data erasure in adjacent tracks. Typically, a laminated write pole is made of a plurality of magnetic layers in which adjacent magnetic layers are separated by a thin non-magnetic spacer. FIGS. 3-5 show simulated results using a micromagnetic modeling program based on the Landau-Lifshitz-Gilbert equation for a conventional laminated write pole having magnetic layers of equal thickness. In FIG. 3, the remanent field at the media surface is shown after a write operation in anti-ferromagnetically coupled pole heads made of 1, 2, and 4 magnetic layers as illustrated by curves 60, 61, and 62, respectively. The magnetostatic interaction or anti-parallel coupling favors opposite directional alternate magnetization configurations so the remanent field from the write pole is effectively reduced as the number of magnetic layers increases. For a certain number of magnetic layers, larger anti-ferromagnetic coupling is more effective in minimizing the remanence. Thus, lamination can reduce remanence by about 10% to 35% compared with a single layer write pole.

Referring to FIG. 4, a graph illustrates a decrease in writability in conventional laminated write poles, particularly near the trailing edge. In this example, a laminated structure with four magnetic layers of equal thickness has a reduced write field near the +0.2 micron down track position (0.05 micron inside from the trailing edge) while an eight layered scheme shows a significant loss in write field across a broad range of down track positions. The data is based on a laminated structure having FeCo magnetic layers with 2 nm thick Ta non-magnetic spacers where the total write pole thickness is kept at 0.25 microns.

Referring to FIG. 5, the perpendicular write field at the trailing edge of the write pole is plotted as a function of the spacer thickness for laminations with a varying number of magnetic layers. As the spacer thickness becomes larger and the number of magnetic layers increases, the write field decreases.

Figure 6A:
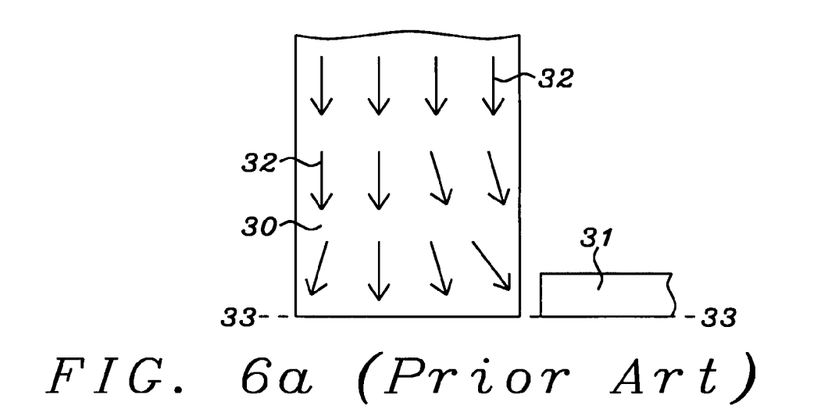
FIG. 6a is a top view that depicts the magnetic flux near the write pole tip in a single layer pole.
Figure 6B:
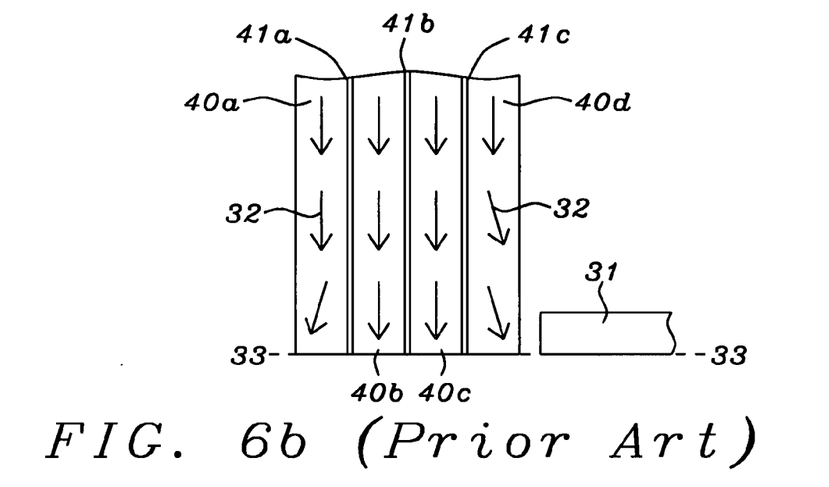
FIG. 6b is a top view that shows the magnetic flux in a conventional laminated write pole near the ABS plane.

Referring to FIG. 6a, a schematic illustration is provided to show the flux density distribution 32 in the write pole tip 30 of a single layer write pole near the ABS plane 33-33. A similar drawing is shown in FIG. 6b for magnetic flux 32 in a laminated write pole where the thickness of the magnetic layers 40a-40d is essentially constant from leading edge to trailing edge near the flux return pole 31. Non-magnetic spacers 41a-41c are also depicted. Flux density in the pole tip is lower for the conventional laminated structure because total magnetic volume is reduced due to the presence of non-magnetic spacers. In addition, the non-magnetic spacer has very low flux density and therefore the boundaries of the magnetic layers adjacent to the spacers also have low flux density. Each magnetic layer effectively operates as an individual thin magnetic layer and flux flow tends to be vertical to the ABS. Flux density in the trailing layer 40d drops significantly because other magnetic layers do not provide their flux and this is the main reason for poor writability.

Figure 7:
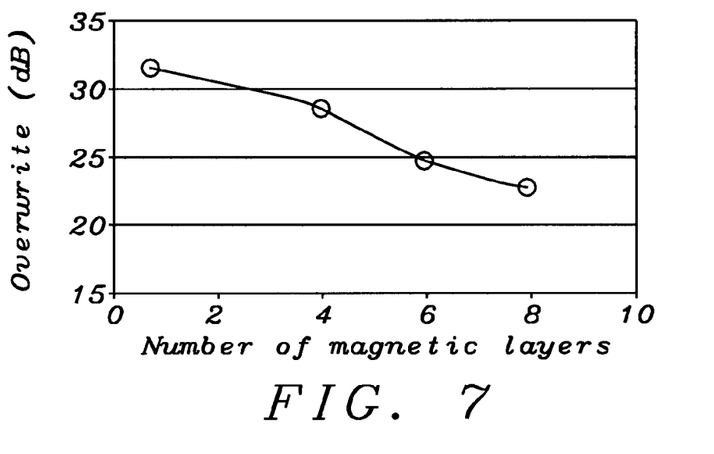
FIG. 7 is a graph that depicts overwrite capability as a function of the number of magnetic layers having equal thickness in a conventional laminated write pole.

In FIG. 7, the overwrite capability is plotted as a function of the number of magnetic layers in a laminated write pole with 2 nm thick non-magnetic spacers and clearly indicates that more lamination leads to poorer overwrite performance.

According to the present invention, various embodiments of laminated write pole structures are provided to overcome the problem of poor writability caused by a reduction in magnetic flux near the trailing edge of the write pole. The inventors have found that a thick trailing magnetic layer can compensate for the introduction of non-magnetic spacers in a laminated write pole scheme. Neighboring magnetic layers are exchange decoupled or antiferromagnetically coupled (AFC) through the thin non-magnetic spacers.

Figure 8A:
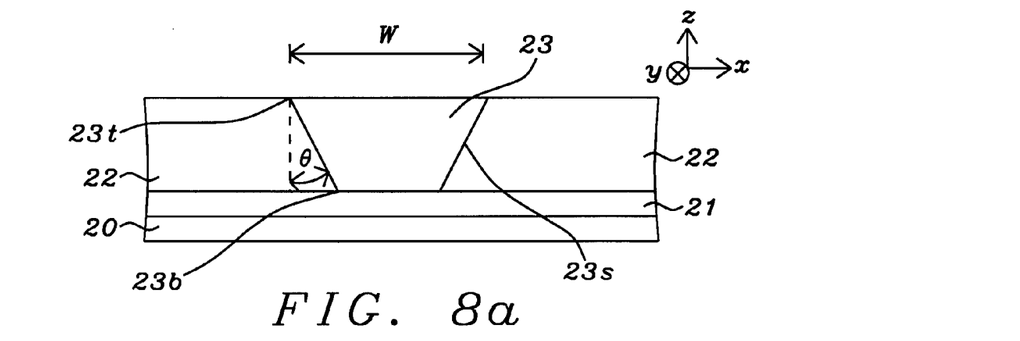
FIG. 8a is a cross-sectional view from an ABS plane of a write pole formed within an insulation layer according to an embodiment of the present invention.

Referring to FIG. 8a, a view of the write pole 23 of a main pole layer formed within an insulation layer 22 according to the present invention is seen from an ABS plane. A substrate 20 is provided that may be comprised of AlTiC, for example. The substrate 20 may also be an insulation layer formed on a top shield (not shown) in a merged read/write head. In the exemplary embodiment, a RIE resistant layer 21 may formed on the substrate 20 by a sputter deposition or physical vapor deposition (PVD) process, for example, and preferably is made of a material such as Ru or NiCr that has a high selectivity relative to an insulating material such as alumina during a subsequent RIE etch that uses $BCl_3$, chlorine, and fluorocarbon gases. Alternatively, the write pole 23 and main pole layer may be formed directly on the substrate 20 or on a seed layer disposed on the substrate. Above the RIE resistant layer 21 is an insulation layer 22 wherein a mold shape comprising an opening for the write pole is formed. The insulation layer 22 may be comprised of $Al_2O_3$ or silicon oxide that is deposited by a PVD process, a sputtering technique, or the like in the same deposition tool as the RIE resistant layer. The insulation layer 22 may also be made of other dielectric materials known in the art. In an embodiment where the write pole 23 and main pole layer (not shown) are sputter deposited to fill the mold opening, the insulation layer 22 has a thickness equivalent to the desired thickness of the main pole layer and a chemical mechanical polish (CMP) technique may be employed to planarize the main pole layer including write pole 23. Optionally, the main pole layer and write pole 23 may be formed by first depositing one or more magnetic layers on the substrate 20 with or without an etch stop layer 21. Then a photoresist layer (not shown) is patterned on the main pole layer material followed by one or more etch steps that define the shape of the write pole 23 and main pole layer. Thereafter, the photoresist is stripped and the insulation layer 22 is deposited. A CMP process may be used to make the insulation layer 22 coplanar with the write pole 23 and main pole layer.

A photoresist patterning and etching sequence for forming a mold in an insulation layer during a main pole layer fabrication has been previously described in Headway application HT07-005 which is herein incorporated by reference in its entirety. In one embodiment, a first photoresist layer is patterned on an insulation layer and etched to form a rectangular shape that corresponds to the pole section of the main pole layer. The rectangular shape is transferred through the insulation layer by a RIE process comprising $BCl_3$, $Cl_2$, and a fluorocarbon gas to generate a trench with beveled sidewalls. Thereafter, the first photoresist layer is removed and a second photoresist layer is coated on the insulation layer and patterned to form a yoke shape opening that is partially superimposed over the rectangular trench. A second etch process involving $BCl_3$ and $Cl_2$ may be employed to transfer the yoke shape opening through the insulation layer and form essentially vertical sidewalls in the yoke section of the mold for the main pole layer. Optionally, other double photoresist patterning and etching sequences or a single photoresist patterning and etch process may be used to form a mold in the insulation layer 22 for depositing the main pole layer comprising write pole 23. However, a technique is preferred that produces essentially vertical sidewalls in the yoke section of the mold and especially adjacent to the neck (not shown) in order to enable a maximum amount of magnetic material volume in the yoke proximate to the neck. A two mask process for forming a mold as previously disclosed by the inventors in Headway patent application Ser. No. 11/820,962 provides an additional advantage of improving dimensional control of the write pole by minimizing the effect of ABS positioning errors.

In one embodiment of the present invention, the write pole 23 has a trapezoidal shape with sloped sidewalls 23s wherein the top surface 23t of the write pole has a larger width along the ABS plane than the bottom surface 23b. Moreover, the sidewalls 23s are sloped at an angle θ of about 5 to 20 degrees with respect to the plane of the RIE resistant layer 21 (and substrate 20). The pole has a beveled shape with an angle so that the skew related writing errors can be suppressed. Note that during a write operation, the write pole 23 moves in a negative "z" direction such that the top surface 23t is the trailing edge. The present invention also anticipates other write pole structures such as one where the top surface 23t has a concave shape that can be formed by performing an etching process on a trapezoidal shape.

In a related Headway patent application Ser. No. 11/825,034, which is herein incorporated by reference in its entirety, a non-AFC lamination scheme is disclosed that involves an amorphous material layer such as a metal oxide inserted between two high moment layers. One embodiment employs alternating AFC lamination (Ru spacer) and non-AFC lamination to minimize remanence, Hc, and Hk.

Figure 8B:
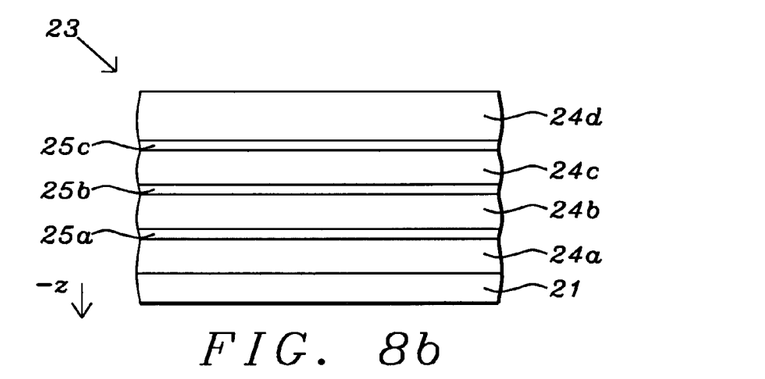
FIG. 8b is an enlarged section of the write pole in FIG. 8a that shows a laminated structure of thicker magnetic layers and thinner non-magnetic layers in which the trailing magnetic layer is larger than the other magnetic layers in the write pole.

Referring to FIG. 8b, an enlarged view of a portion of the write pole 23 in FIG. 8a is shown on the RIE resistant layer 21. In a first embodiment, the laminated write pole 23 is comprised of alternating magnetic layers 24a-24d and non-magnetic spacers 25a-25c. An important feature is that the trailing magnetic layer 24d has a thickness greater than that of the other magnetic layers 24a-24c and preferably has a thickness that comprises ≧25% of the total thickness of the magnetic layers in the write pole 23. Optionally, when the trailing magnetic layer 24d has a concave shape (not shown) with a curved trailing edge, the volume of the trailing magnetic layer is greater than the volume of other magnetic layers 24a-24c and is preferably ≧25% of the total volume of the magnetic layers 24a-24d. The present invention also encompasses other embodiments wherein the number of magnetic layers is unequal to 4 but is an integer greater than 1. Moreover, there may be a cap layer (not shown) formed on the uppermost magnetic layer 24d which functions as a CMP stop during fabrication of the main pole layer comprising write pole 23. Preferably, the non-magnetic spacers 25a-25c have equal thicknesses but the present invention also anticipates that one or more of the non-magnetic spacers may have a thickness unequal to the other non-magnetic spacers. Non-magnetic spacers 25a-25c may be comprised of Ru, Rh, $Al_2O_3$, $SiO_2$, AlN, Ta, Ti, W, Cr, or NiCr and have a thickness in the range of 5 to 100 Angstroms. Magnetic layers 24a-24d may be made of a high moment material such as CoFe, CoFeNi, FeCoN, or FeNi. The movement of the write pole 23 over a magnetic media during a write operation is in the "-z" direction meaning that the surface of magnetic layer 24d farthest from the RIE resistant layer 21 is the trailing edge. It should be understood that the trailing edge is adjacent to a trailing shield through a non-magnetic write gap (not shown).

Figure 9A:
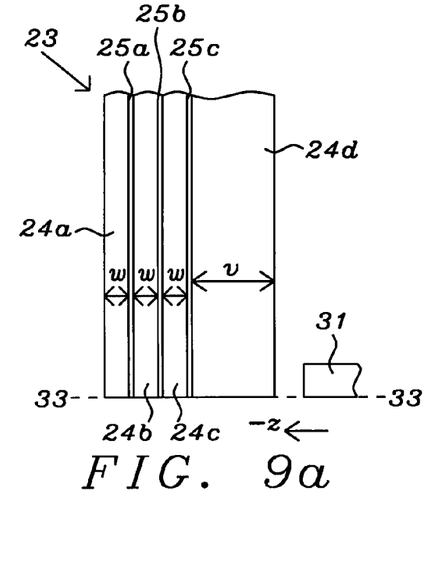
FIG. 9a is a top view of a laminated write pole according to a first embodiment of the present invention in which there is a thick trailing magnetic layer having a greater thickness than other magnetic layers which are equal in size.
Figure 9B:
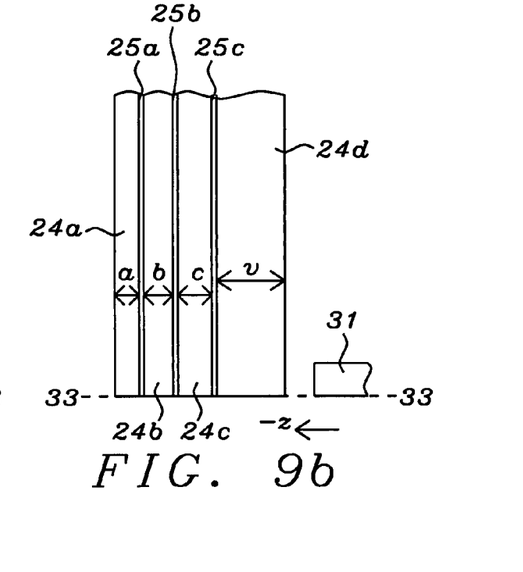
FIG. 9b is a top view of a laminated write pole according to a second embodiment of the present invention in which there is a thick trailing magnetic layer and other magnetic layers in the laminated structure become progressively thinner with increasing distance from the trailing magnetic layer.

Two embodiments of the present invention are depicted in FIGS. 9a, 9b. Note that these drawings represent a top-view (cross-track view) wherein the trailing edge on the larger magnetic layer 24d is shown on the right adjacent to the flux return pole 31. Preferably, there is also a trailing shield (not shown) proximate to the trailing edge of magnetic layer 24d. The write pole 23 moves in the "-z" direction along ABS plane 33-33 during a write operation. Substrate 20, RIE resistant layer 21, and a magnetic media layer are not shown in order to simplify the drawing.

Referring to FIG. 9a, a first embodiment is shown in which magnetic layers 24a-24c have equivalent thickness w which is less than the thickness v of the trailing magnetic layer 24d. Alternatively, for examples in which there are "n" magnetic layers where n>1, "n−1" layers have an equivalent thickness and the trailing magnetic layer has a larger thickness than the other magnetic layers. Preferably, non-magnetic spacers 25a-25c have an equivalent thickness but the thickness of the non-magnetic spacers may vary within the range of 5 to 100 Angstroms as mentioned previously.

Referring to FIG. 9b, a second embodiment is shown in which magnetic layers 24a-24c have a thickness less than v for the trailing magnetic layer 24d. Moreover, the thickness of the magnetic layers becomes progressively smaller as the distance from magnetic layer 24d increases. For example, the thicknesses a, b, and c, for magnetic layers 24a, 24b, and 24c, respectively, have values such that c>b>a. Optionally, for examples where there is a plurality of "n" magnetic layers, the "n−1" layers other than the trailing magnetic layer may each have different thicknesses that become progressively smaller with increasing distance from the trailing magnetic layer. The "n−1" non-magnetic spacers that separate the "n" magnetic layers may have an equivalent thickness or their thicknesses may vary within a range of 5 to 100 Angstroms.

Figure 9C:
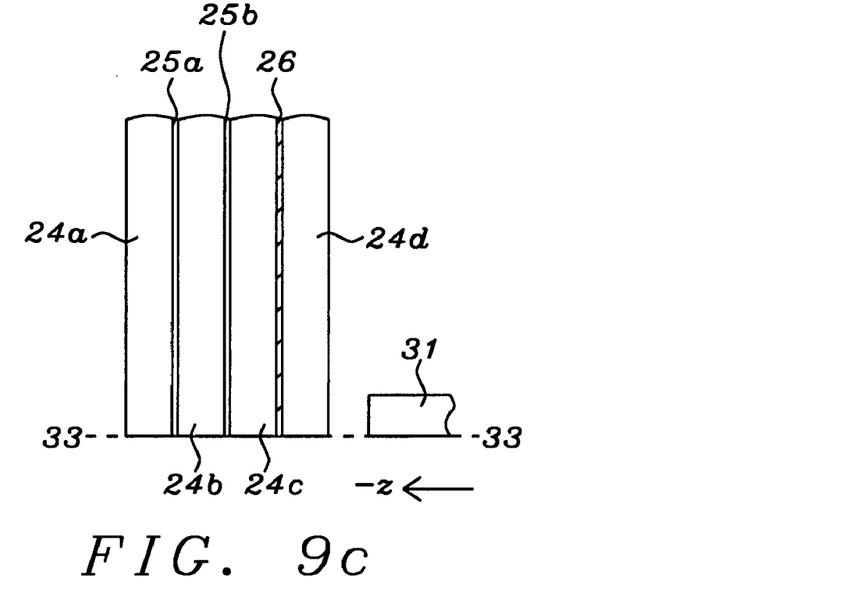
FIG. 9c is a top view of a third embodiment of the present invention wherein there is a magnetic spacer between the trailing layer and the layer adjacent to the trailing layer, and other magnetic layers are separated by a non-magnetic spacer.

Referring to FIG. 9c, a third embodiment of the present invention is illustrated in which a non-magnetic spacer between the trailing magnetic layer 24d and the nearest magnetic layer 24c in preceding embodiments is replaced by a magnetic spacer 26 made of a soft magnetic material which effectively couples the magnetic moments of the aforementioned magnetic layers and thereby increases the effective thickness and volume of the trailing magnetic layer by including the magnetic thickness and volume of the nearest magnetic layer. A key feature is that the thickness of the trailing magnetic layer 24d and the nearest magnetic layer 24c should be greater than that of any of the other magnetic layers 24a, 24b. Thus, this embodiment encompasses a configuration wherein all of the magnetic layers 24a-24d have an equivalent thickness. However, the third embodiment also anticipates other configurations in which the write pole 23 has a plurality of "n" layers wherein at least two of the magnetic layers have different thicknesses. Preferably, the thickness of the trailing magnetic layer near the flux return pole 31 and that of the magnetic layer nearest to the trailing magnetic layer are of sufficient magnitude such that their combined thickness is greater than any of the other magnetic layers. Alternatively, the trailing magnetic layer and the magnetic layer nearest to the trailing magnetic layer have a combined volume that is greater than any of the other magnetic layers. In the third embodiment, the magnetic spacer 26 may be comprised of NiFe, CoNiFe, or a Co based amorphous material and has a thickness from about 20 to 200 Angstroms.

Figure 10:
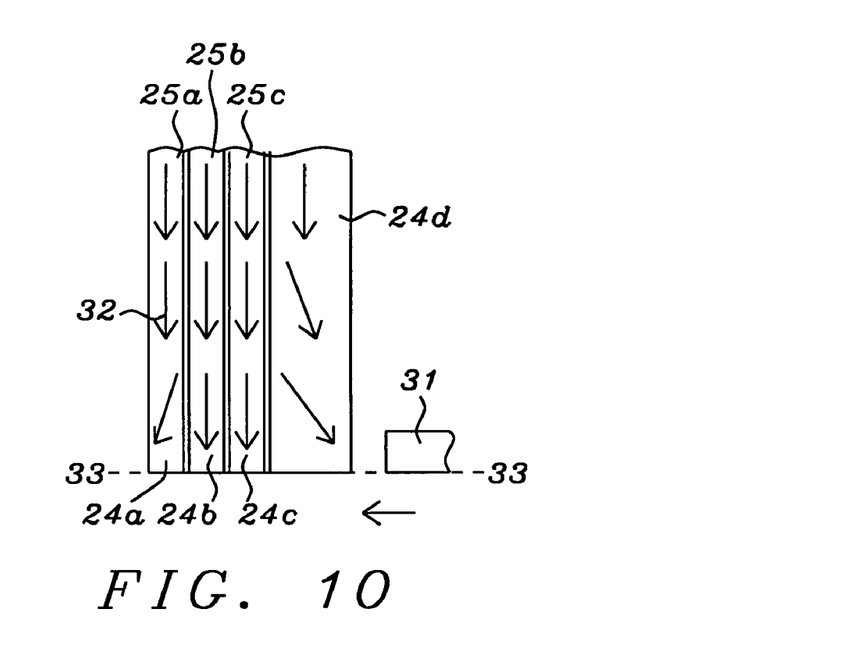
FIG. 10 is a top view of a laminated write pole according to the present invention that depicts the magnetic flux within the various magnetic layers of the laminated structure.
Figure 11A:
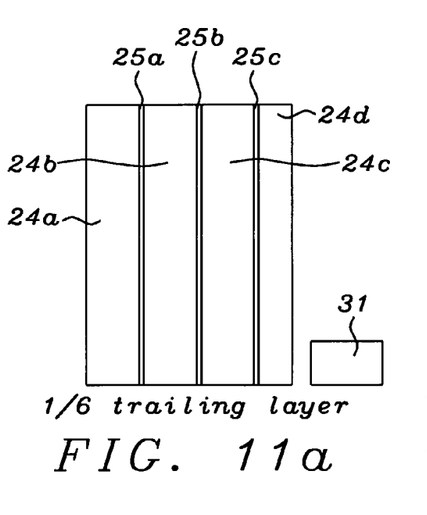
FIGS. 11a-11d are top views of various configurations of a laminated write pole in which the trailing magnetic layer becomes progressively thicker from FIG. 11a to FIG. 11d while the remaining magnetic layers are equivalent in size and the total lamination thickness is constant.
Figure 11B:
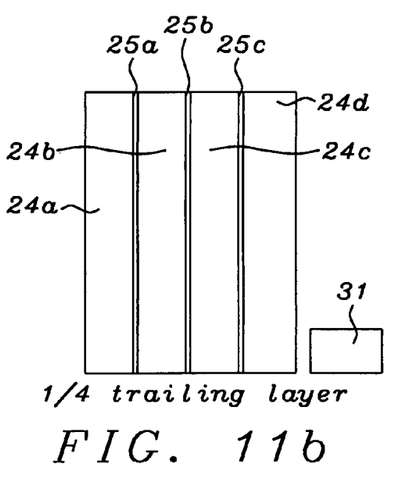
Figure 11C:
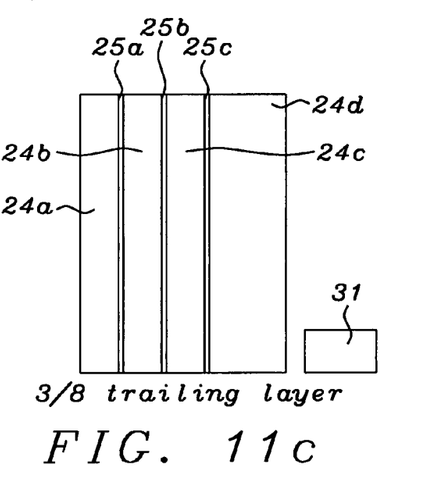
Figure 11D:
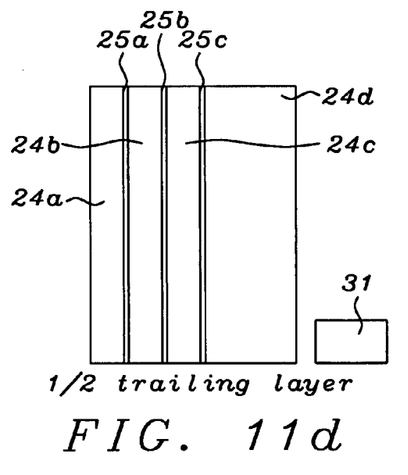

Referring to FIG. 10, the flux density distribution in the thicker trailing magnetic layer design of the first embodiment is depicted. An important feature is that the thicker trailing magnetic layer 24d has a much larger flux density 32 compared with the trailing magnetic layer in laminated layer schemes (FIG. 6b) where the magnetic layers have equivalent thickness. Furthermore, in FIG. 10, the flux direction in magnetic layer 24d is tilted toward the flux return pole 31 near the ABS plane 33-33 thereby substantially improving the head field strength and profile compared with conventional laminated write poles. In order to confirm the effect of a thicker trailing magnetic layer, various laminated write pole configurations shown in FIGS. 11a-11d were evaluated by a finite element method (FEM) calculation. The ratio of the trailing magnetic layer 24d thickness to the total thickness of magnetic layers 24a-24d changes from $\frac{1}{8}$ in FIG. 11a to $\frac{1}{4}$ in FIG. 11b to $\frac{3}{8}$ in FIG. 11c and to $\frac{1}{2}$ in FIG. 11d. Total thickness in each configuration is fixed at 0.25 microns. Note that the thicknesses of magnetic layers 24a-24c are equivalent in each configuration but become progressively smaller as the trailing magnetic layer 24d grows in size from configuration (a) to (b) to (c) to (d).

Figure 12A:
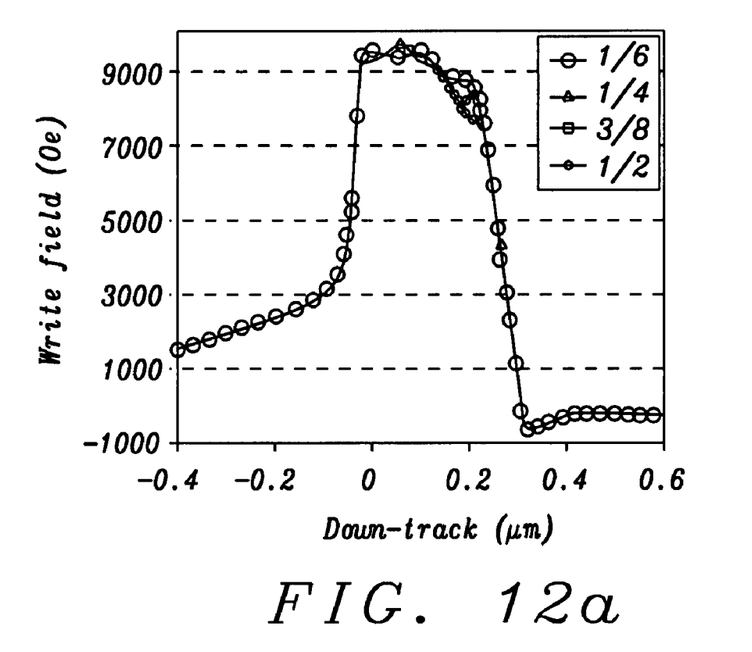
FIG. 12a and FIG. 12b are graphs that depict the write field as a function of down track position for the various laminated configurations in FIGS. 11a-11d.
Figure 12B:
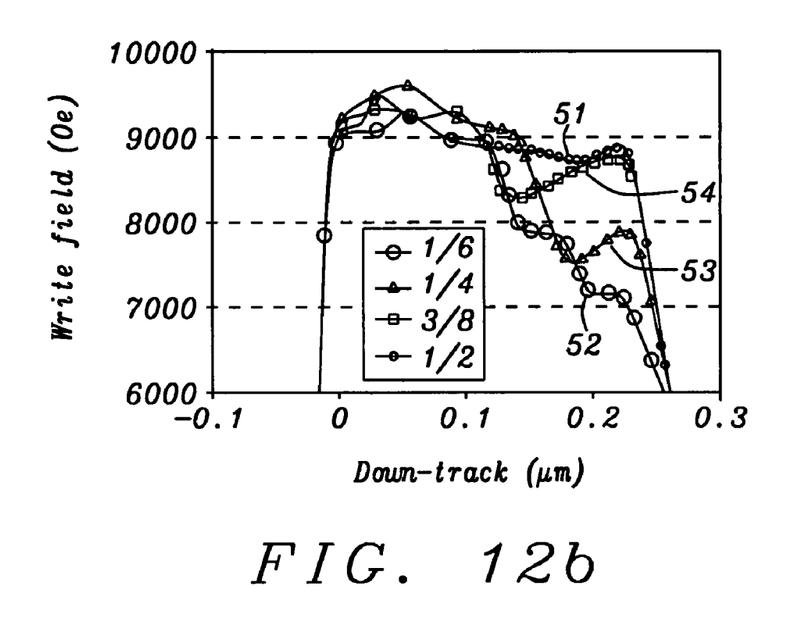

In FIGS. 12a, 12b, the calculated perpendicular head field profiles in heads having write pole configurations (a)-(d) are shown. Referring to FIG. 12b, a close up view of the write pole down-track profiles is depicted. It is clear that configuration (d) with the thickest trailing magnetic layer 24d has the highest write field at the trailing edge (around the +0.2 micron down-track position) as shown in curve 51. Besides a higher write field intensity for curve 51, the head field gradient is also improved. Curves 52, 53, and 54 show the write field for configurations (a), (b), and (c), respectively.

Figure 13:
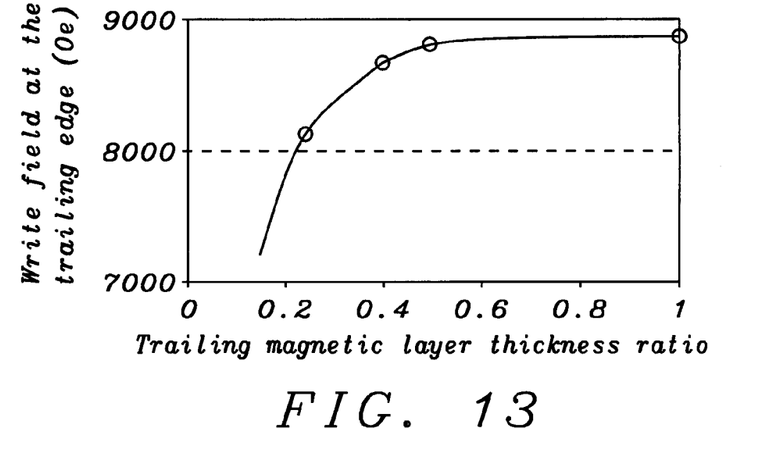
FIG. 13 is a graph showing write field at the trailing edge as a function of the trailing magnetic layer thickness ratio for the laminated configurations in FIGS. 11a-11d.

Referring to FIG. 13, the perpendicular write field for configurations (a) to (d) in FIGS. 11a-11d is plotted as a function of the ratio of trailing magnetic layer thickness to total magnetic layer thickness. A ratio of 1 along the x-axis represents a single layer write pole. The curve in FIG. 13 indicates that a higher ratio provides a larger write field that starts to saturate around a ratio of 0.4. In other words, at a ratio of 0.5 or greater as in configuration (d), the write field of a laminated scheme according to the present invention is essentially the same as for a single write pole layer.

Figure 14:
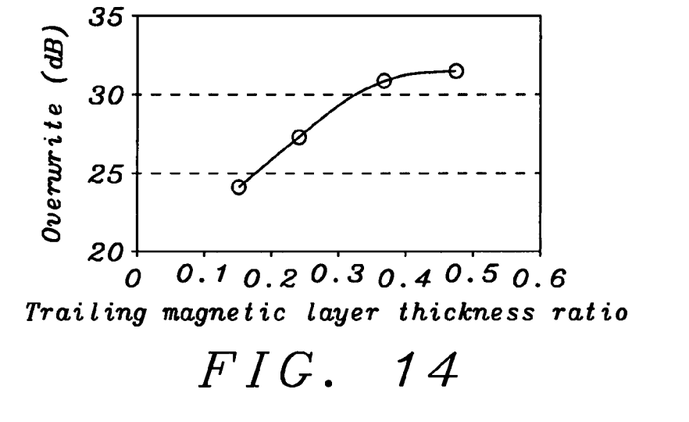
FIG. 14 is a graph showing the overwrite capability as a function of the trailing magnetic layer thickness ratio for the laminated configurations in FIGS. 11a-11d.

Referring to FIG. 14, the laminated pole configurations (a)-(d) represented in FIGS. 11a-11d were tested on a perpendicular media and the resulting overwrite performance is shown as a function of the ratio of trailing magnetic layer 24d thickness to total magnetic layer 24a-24d thickness. The results are in agreement with the calculated write field at the trailing edge (FIG. 13) as the thicker trailing magnetic layer (higher ratio) improves the overwrite capability and the improvement starts to level off around the 0.4 ratio. Therefore, configuration (d) offers the best advantage in terms of better overwrite and larger write field at the trailing edge for laminated designs and there is a slight drop off in improvement for configuration (c).

Figure 15:
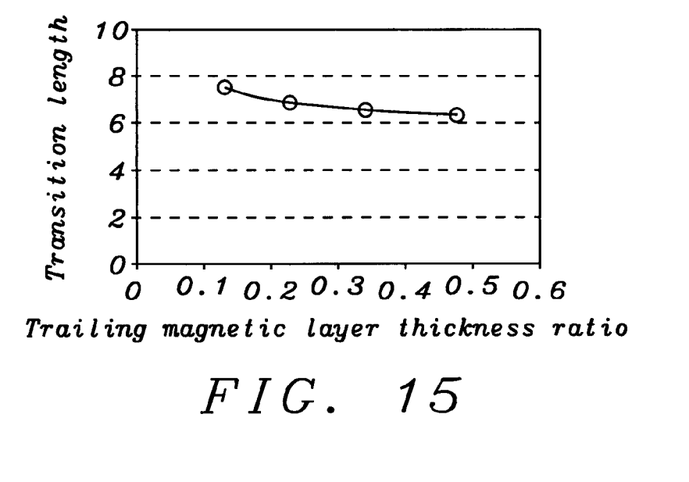
FIG. 15 is a graph showing transition length as a function of the trailing magnetic layer thickness ratio for the laminated configurations in FIGS. 11a-11d.

Referring to FIG. 15, transition length is plotted as a function of the ratio of trailing magnetic layer 24d thickness to total magnetic layer 24a-24d thickness for the laminated write pole configurations in FIGS. 11a-11d. Since it is well known that transition length correlates closely with media signal to noise ratio, the smaller transition length at the higher thickness ratio for configuration (d) means an improved signal to noise ratio over other laminated write pole configurations. Note that for conventional write pole laminations that have four magnetic layers of equivalent thickness, the ratio of 0.25 is expected to be similar to that of configuration (b) in FIG. 11b which is clearly inferior in overwrite performance, transition length, and write field magnitude in the down-track positions to configurations (c) and (d) in FIGS. 11c, 11d, respectively, that represent embodiments of the present invention.

Thus, the inventors have demonstrated that a thicker trailing magnetic layer in a laminated write pole structure having adjacent magnetic layers antiferromagnetically coupled through a non-magnetic spacer provides several advantages over prior art configurations wherein magnetic layers in a laminated scheme have essentially the same thickness. Furthermore, the inventors have disclosed a variation of the first embodiment in which the non-magnetic spacer between the trailing magnetic layer and a neighboring magnetic layer is replaced by a magnetic spacer to couple the magnetic moments in those two magnetic layers and effectively increase the magnetic volume in the trailing magnetic layer. As a result, the advantages of the second embodiment are anticipated to approximate the benefits in overwrite capability, improved field strength at the down-track positions, and better signal to noise ratio achieved with the first embodiment.

While this invention has been particularly shown and described with reference to, the preferred embodiment thereof, it will be understood by those skilled in the art that various changes in form and details may be made without departing from the spirit and scope of this invention.

We claim:

1. A laminated write pole structure having a trapezoidal shape along an air bearing surface (ABS) and comprised of a stack of layers formed on a substrate, comprising:

(a) a plurality of "n" high moment magnetic layers with a composition (M) each having a thickness in a direction perpendicular to the substrate wherein a magnetic layer farthest from the substrate is defined as the trailing magnetic layer during a write operation and has a thickness greater than the thickness of any of the other magnetic layers and wherein the plurality of high moment magnetic layers guide magnetic flux to the ABS during the write operation; and (b) "n−1" non-magnetic spacers (S) that are formed in alternating fashion with the magnetic layers to give a $[M/S]_n M$ configuration such that there is a non-magnetic spacer that separates neighboring magnetic layers and has a thickness that promotes an antiferromagnetic coupling or exchange decoupling between neighboring magnetic layers.

2. The laminated write pole structure of claim 1 wherein the magnetic layers are comprised of CoFe, CoFeNi, FeCoN, or FeNi, and the non-magnetic spacers are comprised of Ru, Rh, $Al_2O_3$, $SiO_2$, AlN, Ta, Ti, W, Cr, or NiCr and have a thickness between about 5 and 100 Angstroms.

3. The laminated write pole structure of claim 1 wherein the trailing magnetic layer has a thickness $\geq 25\%$ of the total thickness of the plurality of "n" magnetic layers.

4. The laminated write pole structure of claim 1 wherein the trailing magnetic layer has a volume $\geq 25\%$ of the total volume of the plurality of "n" magnetic layers.

5. The laminated write pole structure of claim 1 wherein the "n−1" magnetic layers between the trailing magnetic layer and the substrate have the same thickness.

6. The laminated write pole structure of claim 1 wherein the non-magnetic spacers all have the same thickness.

7. A method of forming a laminated write pole structure in a PMR write head, comprising:

forming a stack of layers on a substrate, said stack of layers is comprised of:

(a) a plurality of "n" high moment magnetic layers each having a composition (M) and a thickness in a direction perpendicular to the substrate wherein a magnetic layer farthest from the substrate is defined as the trailing magnetic layer during a write operation and has a thickness greater than the thickness of any of the other magnetic layers and wherein the plurality of high moment magnetic layers guide magnetic flux to an air bearing surface (ABS) during a write operation; and (b) "n−1" non-magnetic spacers (S) that are formed in alternating fashion with the magnetic layers to give a $([M/S]_n M$ configuration such that there is a non-magnetic spacer that separates neighboring magnetic layers and has a thickness that promotes an antiferromagnetic coupling or exchange decoupling between neighboring magnetic layers; and patterning said stack of layers to form sidewalls that connect said trailing magnetic layer to said substrate and generate a write pole having a trapezoidal shape along the ABS.

8. The method of claim 7 wherein the magnetic layers are comprised of CoFe, CoFeNi, FeCoN, or FeNi and the non-magnetic spacers are comprised of Ru, Rh, $Al_2O_3$, $SiO_2$, AlN, Ta, Ti, W, Cr, or NiCr and have a thickness between about 5 and 100 Angstroms.

9. The method of claim 7 wherein the trailing magnetic layer has a volume $\geq 25\%$ of the total volume of the plurality of magnetic layers.

10. The method of claim 7 wherein the trailing magnetic layer has a thickness $\geq 25\%$ of the total thickness of the plurality of magnetic layers.

11. The method of claim 7 wherein the "n−1" magnetic layers between the trailing magnetic layer and the substrate have the same thickness.

* * * * *